(12) United States Patent
Malot et al.

(10) Patent No.: US 9,051,899 B2
(45) Date of Patent: Jun. 9, 2015

(54) EXHAUST CONE FOR AIRCRAFT TURBOJET ENGINE

(71) Applicant: AIRCELLE, Gonfreville l'Orcher (FR)

(72) Inventors: Helene Malot, Sainte Adresse (FR); Philippe Bienvenu, Rogerville (FR)

(73) Assignee: AIRCELLE, Gonfreville l'Orcher (FR)

( * ) Notice: Subject to any disclaimer, the term of this patent is extended or adjusted under 35 U.S.C. 154(b) by 0 days.

(21) Appl. No.: 14/177,494

(22) Filed: Feb. 11, 2014

(65) Prior Publication Data

US 2014/0158458 A1 Jun. 12, 2014

Related U.S. Application Data

(63) Continuation of application No. PCT/FR2012/051583, filed on Jul. 5, 2012.

(51) Int. Cl.
*G10K 11/172* (2006.01)
*F02K 1/82* (2006.01)
*F02K 1/04* (2006.01)
*F02K 1/44* (2006.01)
*F02K 1/80* (2006.01)

(52) U.S. Cl.
CPC . *F02K 1/827* (2013.01); *F02K 1/04* (2013.01); *F02K 1/44* (2013.01); *F02K 1/80* (2013.01); *F05D 2260/30* (2013.01); *F05D 2230/232* (2013.01); *F05D 2250/283* (2013.01); *Y02T 50/671* (2013.01)

(58) Field of Classification Search
CPC .......... G10K 11/172; B64F 1/26; F02C 7/045
USPC .............. 181/222, 213, 292, 290; 244/1 N
See application file for complete search history.

(56) References Cited

U.S. PATENT DOCUMENTS

| 6,358,590 | B1 | 3/2002 | Blair et al. |
| 8,579,584 | B2 * | 11/2013 | Brown ......................... 415/192 |
| 2006/0000944 | A1 * | 1/2006 | Dron ............................... 244/54 |
| 2011/0072781 | A1 * | 3/2011 | Birch et al. .................. 60/226.3 |
| 2011/0203255 | A1 * | 8/2011 | Conete ......................... 60/226.1 |
| 2011/0303786 | A1 * | 12/2011 | Starobinski et al. .......... 244/1 N |
| 2013/0232981 | A1 * | 9/2013 | Pascu et al. .................... 60/770 |
| 2014/0003922 | A1 * | 1/2014 | Daniels et al. ............. 415/182.1 |

FOREIGN PATENT DOCUMENTS

| EP | 0 316 233 A1 | 5/1989 |
| EP | 0 540 193 A1 | 5/1993 |
| FR | 2 949 820 A1 | 3/2011 |
| FR | 2988777 | * 3/2012 |
| GB | 1 543 312 A | 4/1979 |
| GB | 2 259 954 A | 3/1993 |

OTHER PUBLICATIONS

International Search Report issued Aug. 30, 2012 in International Application No. PCT/FR2012/051583.

* cited by examiner

*Primary Examiner* — Forrest M Phillips
(74) *Attorney, Agent, or Firm* — Brinks Gilson & Lione

(57) ABSTRACT

An exhaust cone for an aircraft turbojet engine includes a front part which has a front end and a rear end. The front end is equipped with a front connecting flange connecting to an outlet of a turbojet engine and the rear end is equipped with a rear connecting flange connecting to a rear part of the exhaust cone. In particular, the front part is further equipped with a sound attenuation structure including an outer skin, and the outer skin overlaps the front connecting flange and the rear connecting flange.

6 Claims, 3 Drawing Sheets

EXHAUST CONE FOR AIRCRAFT TURBOJET ENGINE

CROSS-REFERENCE TO RELATED APPLICATIONS

This application is a continuation of International Application No. PCT/FR2012/051583, filed on Jul. 5, 2012, which claims the benefit of FR 11/57321, filed on Aug. 12, 2011. The disclosures of the above applications are incorporated herein by reference.

FIELD

The present disclosure relates to an exhaust cone for an aircraft turbojet engine.

BACKGROUND

The statements in this section merely provide background information related to the present disclosure and may not constitute prior art.

As is known in itself, it is generally suitable to provide an exhaust cone/primary nozzle assembly at the rear of an aircraft turbojet engine, so as to optimize the flow of the hot gasses expelled by the turbojet engine on the one hand, and to absorb at least some of the noise created by the interaction of those hot gasses with the ambient air and with the cold air flow expelled by the fan of the turbojet engine on the other hand.

These elements are commonly referred to as a "cone" and a "nozzle" or "primary nozzle".

One such traditional exhaust cone 1 is shown in FIG. 1 appended hereto, on which the front and rear of the structure along an engine axis are situated on the left and right sides of the figure, respectively.

This exhaust cone is intended to be positioned downstream from the turbine of the turbojet engine, above which the primary nozzle is placed concentrically. The exhaust cone and the primary nozzle are both fastened on a casing of the turbojet engine by a flange fastening system.

More specifically, the exhaust cone 1 comprises, strictly speaking, a front part 5 (commonly called the "front cone"), which is substantially cylindrical, and a rear part 7 (commonly called the "rear cone"), which is conical.

The front part 5 can in particular be acoustic or stiffened monolithic.

If the first part 5 is acoustic, that means that it comprises at least one peripheral sound attenuation structure of the sandwich type comprising at least one resonator, in particular of the honeycomb type, covered by a perforated outer skin and a solid inner skin.

The outer skin also constitutes an outer surface (sheet) of the front part 5 of the exhaust cone.

If the front part 5 is stiffened monolithic, that means that the structure is made up of a single sheet reinforced by stiffeners.

The rear part 7 is monolithic and stiffened by stiffeners 9d.

The front part 5 and the rear part 7 of the exhaust cone may in particular be made from sheets of metal alloy of the Inconel 625 type and may be assembled using a flange junction system denoted 9b for the front flange part and 9c for the rear flange part.

The front part 5 further comprises an upstream connecting flange 9a designed to allow it to be attached to the rear of the turbojet engine.

FIG. 2 shows that, traditionally, the flange 9b of the front part 5 has a part 11 with a diameter substantially equal to that of the outer skin of said front part 5 on the one hand, and a part 13 with a diameter smaller than that of the flange 9c of the rear part 7 to which it is designed to be connected, such that said part 13 of the flange 9b can be inserted inside the flange 9c of the rear part 7, on the other hand.

Housings 15 formed in the thickness of the flange 9c make it possible to receive bolts 17 passing through said flange 9c and the flange 9b, fastened using nuts 18 attached through the inside of the exhaust cone 1 thus assembled.

The housings 15 make it possible to prevent the heads 19 of the bolts 17 from protruding toward the outside of the cone 1, and thus do not cause aerodynamic losses.

As can be understood in light of the preceding, an exhaust cone of the prior art (FIG. 2) is a complex structure, involving many parts, and has a high manufacturing cost and affects the mass of the assembly, which is not desirable.

There is therefore a constant need to simplify the assembly structure of such an exhaust cone, so as to reduce both the mass and manufacturing cost thereof.

In particular, according to the prior art, if the front part is of the acoustic type, the acoustic panel is closed at its front and rear ends, respectively, by peripheral flanges having a C-shaped section and commonly called closing Cs.

These closing Cs are connected, in particular by brazing, to the corresponding front and rear flanges respectively providing the connection with the turbojet engine and the rear cone part and provide a large portion of the maintenance of the sound attenuation structure.

These closing Cs are expensive parts made by machining, and above all they represent a non-negligible mass relative to the total mass of the exhaust cone.

SUMMARY

The present disclosure is provided to simplify the design of the sound attenuation structure and the exhaust cone by eliminating these closing Cs.

The present disclosure provides an exhaust cone for an aircraft turbojet engine including a front part having a front end equipped with a connecting flange connecting to an outlet of a turbojet engine and/or a rear end equipped with a connecting flange connecting to a rear part of the exhaust cone, said front part further being equipped with at least one sound attenuation structure comprising a corresponding outer skin, characterized in that the outer skin overlaps at least part of the corresponding front or rear connecting flange and is assembled to the latter.

Thus, by providing a direct link between the outer skin of the front part and the corresponding front and/or rear connecting flange, respectively, it is no longer necessary to use a closing C of the acoustic panel serving as an interface between the sandwich panel and the front and/or rear connecting flanges of the front part of the exhaust cone.

Of course, this type of direct link between the sound attenuation structure and the front/rear connecting flanges of the front part may concern only one or both of the closing Cs.

According to a first form, the outer skin and the front and/or rear connecting flanges are assembled by riveting.

According to a second form, the outer skin and the front and/or rear connecting flanges are assembled by brazing.

In still another form, the rear connecting flange also constitutes a front connecting flange for a rear part of the exhaust cone.

Advantageously, the outer skin is made from a metal alloy, such as Inconel 625.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

The present disclosure will be better understood upon reading the following detailed description in light of the appended drawing, in which.

Figure 1:
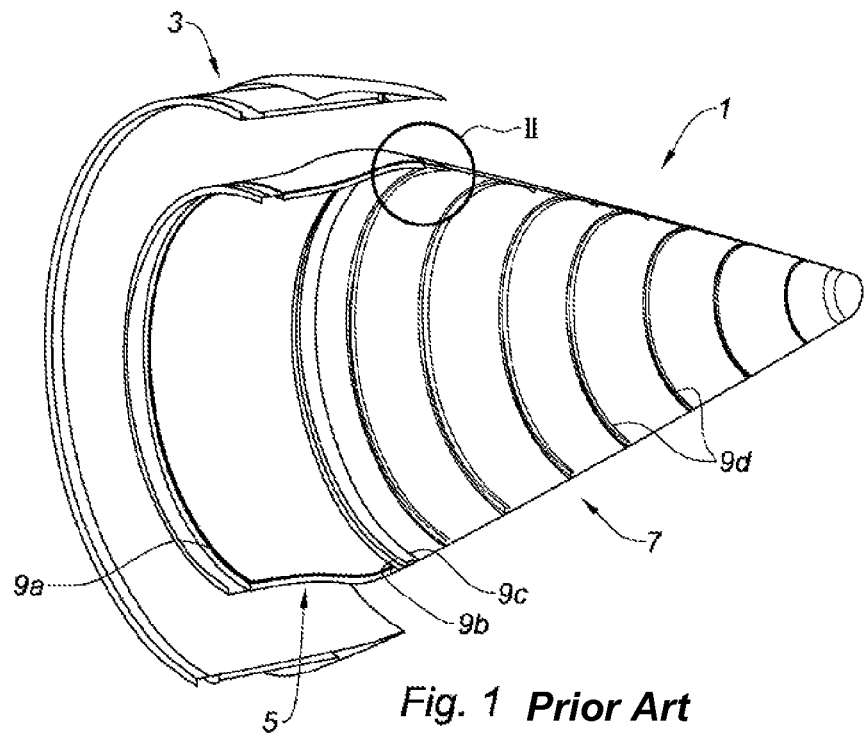
FIG. 1 is a perspective and axial cross-sectional view of an exhaust cone of the prior art, mentioned in the preamble of the present description.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
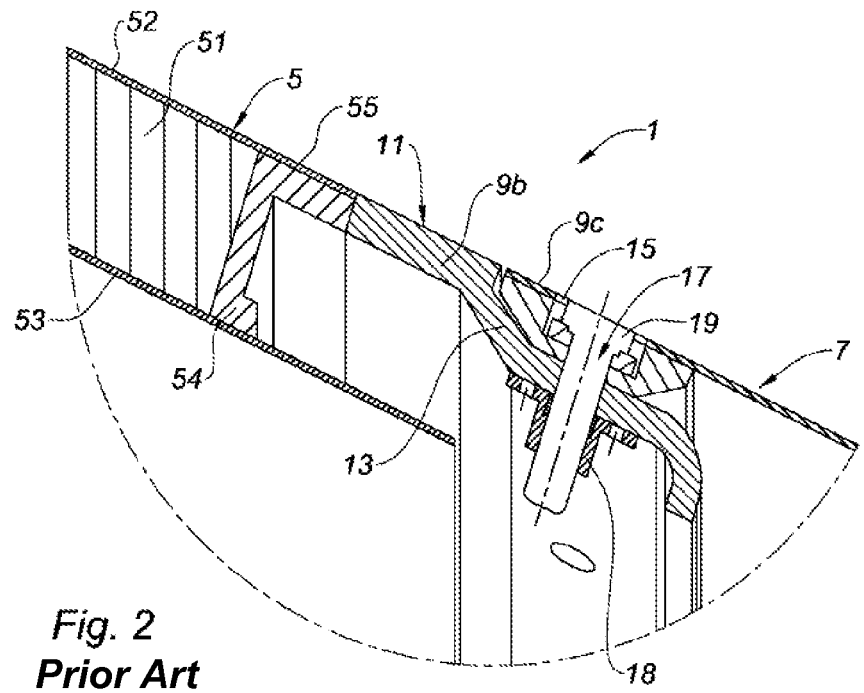
FIG. 2 is an enlarged view of a junction zone between the acoustic panel and a rear connecting flange connecting to a rear part of the exhaust cone and showing the use of a closing C of the acoustic panel according to the prior art.

As shown more precisely in FIG. 2, the front part 5 of the exhaust cone 1 is equipped with a sound attenuation structure comprising a cellular core 51, for example a honeycomb structure, covered by a perforated outer skin 52 and a solid inner skin 53.

As previously described and according to the prior art, the cellular core is closed by a closing C 54, said closing C also being covered by an extension 55 of the outer skin 52, that extension not being perforated, and by an extension of the inner skin 53.

The connection between the sound attenuation structure and the rear connecting flange 9b is provided by the closing C 54, as previously explained, in particular by brazing between those elements.

The flange 9b has a thickness ensuring the absence of any offset (step) with the outer skin 52 and its extension 55 so as to provide the outer aerodynamic continuity of the front cone part 5.

Figure 3:
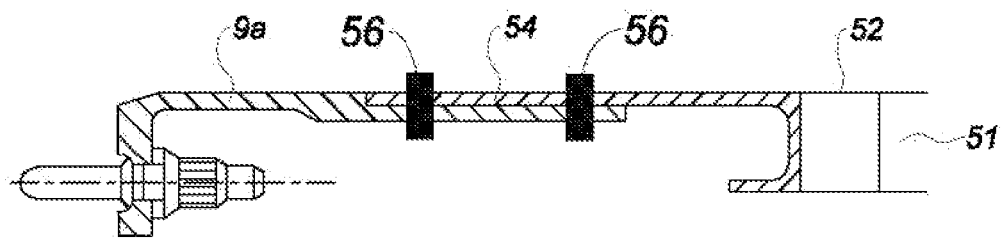
FIG. 3 is an enlarged view of a junction area between the acoustic panel and a front connecting flange connecting to a turbojet engine and showing the use of a closing C of the acoustic panel according to the prior art.
Figure 4:
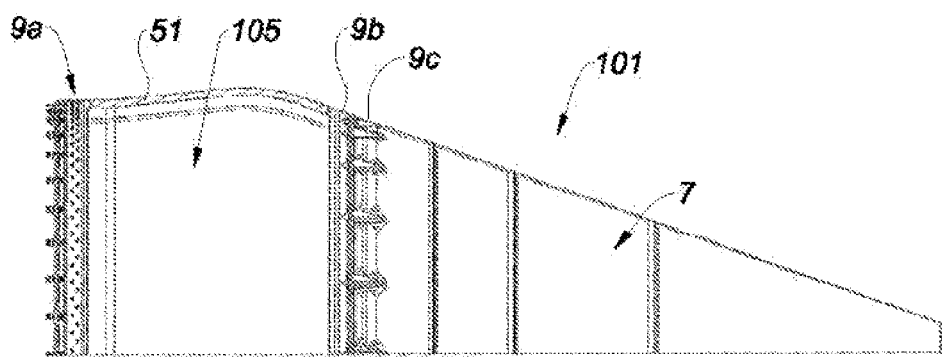
FIG. 4 is a longitudinal cross-sectional view of an exhaust cone according to the present disclosure.

Similarly, in the front part, the junction shown in FIG. 3 between the sound attenuation structure and the connecting flange 9a is done using a closing C using rows of rivets 56.

According to the present disclosure and as shown in more detail in FIGS. 4 to 7, in which the sound attenuation structure is not supported using closing Cs 54.

To that end, the present disclosure provides an exhaust cone 101 for an aircraft turbojet engine comprising a front cone part 105 with a substantially cylindrical shape and equipped with at least one sound attenuation structure, said front part 105 having an upstream end equipped with a front connecting flange 9a connecting to an outlet of a turbojet engine on the one hand, and a downstream end equipped with a rear connecting flange 9b connecting to a substantially conical rear cone part 7 on the other hand.

The front part 105 of the cone is, as previously described, made from a sound attenuation structure comprising a cellular core 51 covered by a perforated outer skin 52 and a solid inner skin 53.

According to the present disclosure, the outer skin 52 extends the cellular core (non-perforated extension) and overlaps at least part of the corresponding front 9a and/or rear 9b connecting flanges and is assembled to the latter.

Figure 5:
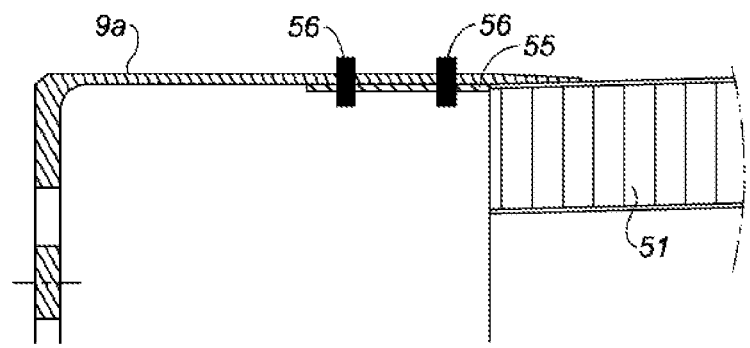
FIGS. 5 and 6 are partial diagrammatic cross-sectional views of the attachment areas of the acoustic panel to a front connecting flange according to two assembly modes of the acoustic panel with the front connecting flange.

As shown diagrammatic in FIG. 5, the outer skin 55 and the front connecting flange 9a are assembled at their connecting area by rivets 56.

Figure 6:
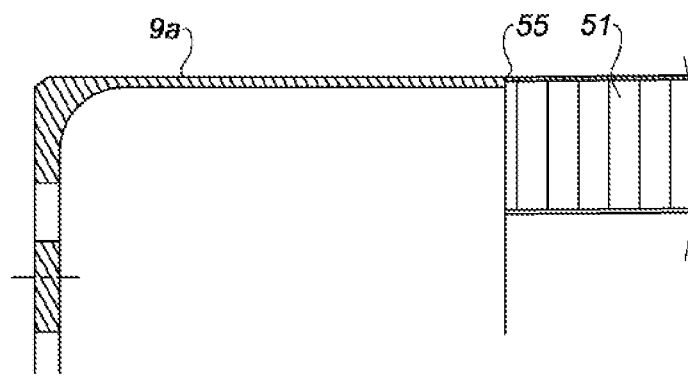

Alternatively, as shown in FIG. 6, the outer skin 55 and the front connecting flange 9a are assembled at their connecting area by welding.

The assembly by welding makes it possible to provide the continuity of the aerodynamic profile by eliminating any offsets (steps) between the front connecting flange 9a and the outer skin 55.

Figure 7:
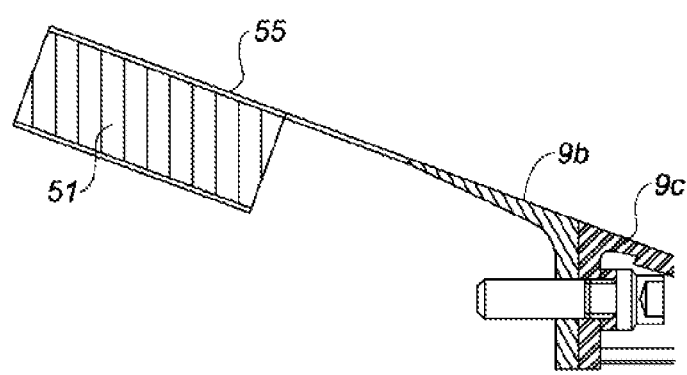
FIG. 7 is a partial diagrammatic cross-sectional view of the rear area of the acoustic panel attached to the rear connecting flange of the front part of the cone.

As shown in FIG. 7, the same principle is applicable to the rear end of the front part 105 with the rear connecting flange 9b, which in turn is attached to the front flange 9c of the rear part 7.

According to one particular form that is not shown, the rear connecting flange 9b also constitutes a front connecting flange 9c of a rear part 7 of the exhaust cone 101.

Advantageously, the outer skin is made from a metal alloy, such as Inconel 625. That same material may be used for all or part of the flanges.

Of course, the present disclosure is in no way limited to the forms described and shown.

What is claimed is:

1. An exhaust cone for an aircraft turbojet engine, said exhaust cone comprising;
    a front part having at least one of a front end equipped with a front connecting flange connecting to an outlet of a turbojet engine and a rear end equipped with a rear connecting flange connecting to; and
    a rear part of the exhaust cone, the rear connecting flange connected to the rear part of the exhaust cone, and said front part further being equipped with at least one sound attenuation structure comprising a cellular core covered by an outer skin,
    wherein the outer skin overlaps at least one of the front connecting flange and the rear connecting flange.

2. The exhaust cone according to claim 1, wherein the outer skin and at least one of the front and rear connecting flanges are assembled by riveting.

3. The exhaust cone according to claim 1, wherein the outer skin and at least one of the front and rear connecting flanges are assembled by welding.

4. The exhaust cone according to claim 1, wherein the rear connecting flange constitutes a front connecting flange for the rear part of the exhaust cone.

5. The exhaust cone according to claim 1, wherein the outer skin is made from a metal alloy.

6. The exhaust cone according to claim 1, wherein the outer skin is made from a Nickel-Chromium alloy.

* * * * *